United States Patent [19] [11] 3,649,001
Schieven [45] Mar. 14, 1972

[54] METHOD FOR HOLDING A MULTILAYER ASSEMBLY OF MATERIALS AND PARTS IN ALIGNMENT

[72] Inventor: Stanley R. Schieven, Webster, N.Y.
[73] Assignee: Eastman Kodak Company, Rochester, N.Y.
[22] Filed: July 15, 1969
[21] Appl. No.: 841,888

[52] U.S. Cl. .................................. 270/52, 83/33, 226/95, 270/58
[51] Int. Cl. ................................................................ B65h
[58] Field of Search ................. 270/52, 58, 59, 60, 12, 45; 271/74; 83/374, 650; 226/95

UNITED STATES PATENTS

| 3,285,112 | 11/1966 | Dale et al. | 271/74 |
| 3,397,826 | 8/1968 | Hawley et al. | 83/650 |
| 3,468,606 | 9/1969 | Wolf et al. | 226/95 X |
| 3,495,492 | 2/1970 | Gerber et al. | 83/374 |

Primary Examiner—Robert W. Michell
Assistant Examiner—L. R. Oremland
Attorney—Karl T. Naramore, William T. French and Robert F. Crocker

[57] ABSTRACT

To hold a plurality of sheets in a given superposed relationship on a conveyor by vacuum all but the uppermost sheet is provided with openings through which the vacuum can be transmitted to the uppermost sheet.

6 Claims, 5 Drawing Figures

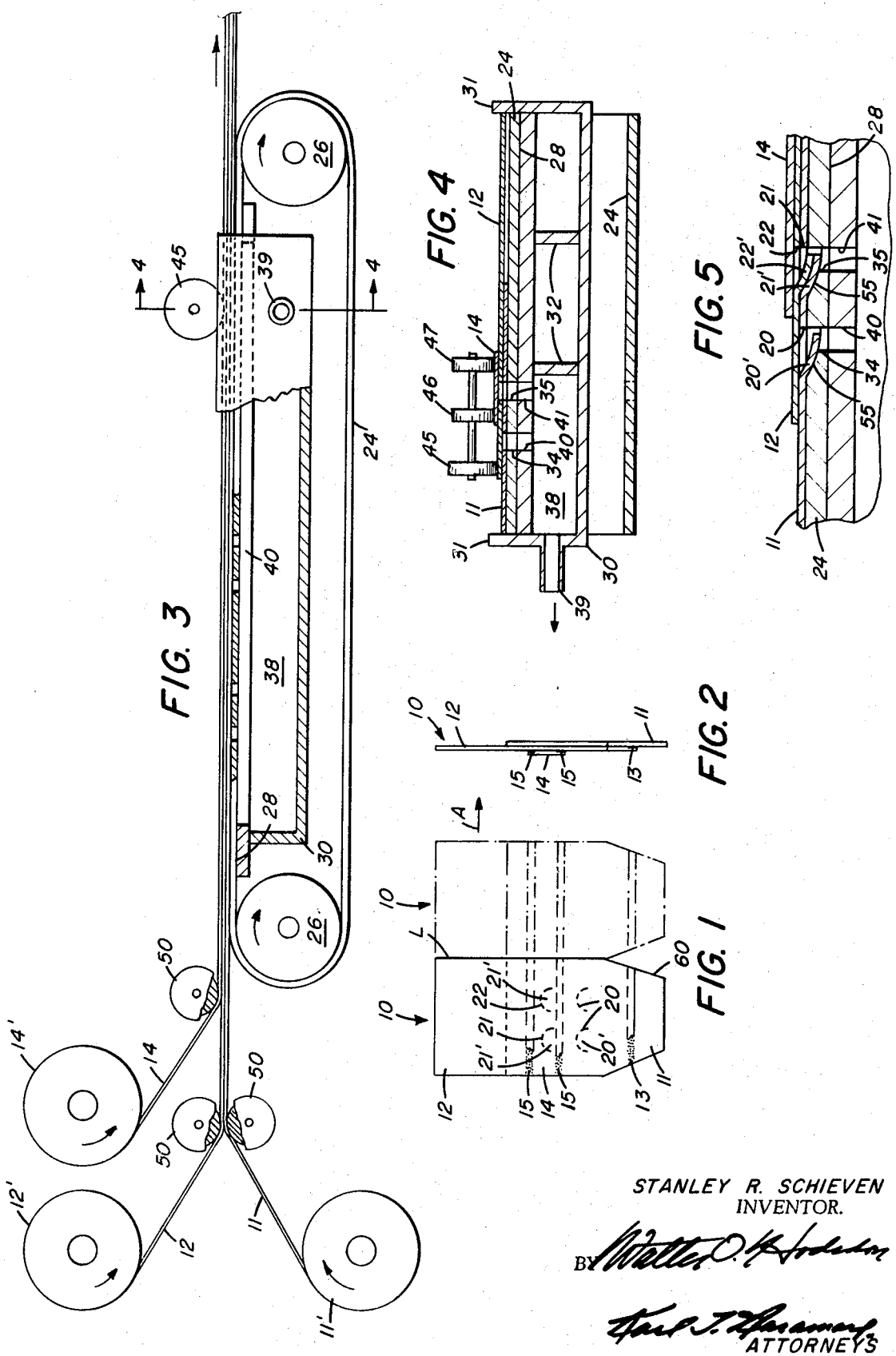

3,649,001

METHOD FOR HOLDING A MULTILAYER ASSEMBLY OF MATERIALS AND PARTS IN ALIGNMENT

The present invention relates to a method and apparatus for holding a plurality of sheets of material or other parts in a prealigned superposed relationship while some operation is performed thereon.

It is often necessary and/or desirable to hold two or more sheets of material or other parts in a certain prealigned superposed relationship while some operation, e.g., perforating, heat sealing the two sheets together, cutting them to a given shape and/or size, etc., is performed thereon. It is not always possible or convenient to hold such elements in superposed relation by a mechanical means, by an adhesive, etc., particularly in situations where the parts are to be conveyed to and from a station where the operation thereon is to be performed.

According to the present invention, two or more parts are held in a prealigned superposed relationship by the use of a vacuum while the necessary operations are performed thereon. While vacuum has been previously used to hold a single sheet of material or other part onto the periphery of a rotating drum, in vacuum feed shuttles, and the like, applicant is unaware of any use of a vacuum to hold two or more sheets of material together in prealigned superposed relation while some operation is performed thereon. The use of a vacuum to this end is believed to be unobvious particularly in instances where the lowermost sheets of the multilayer assembly are impervious to the passage of air, because the vacuum applied to the lowermost sheet or part of the assembly would not be effective to hold the uppermost sheets or parts down onto the lowermost sheet.

The primary object of the present invention is to provide a method of holding two or more sheets of material or other parts in a prealigned superposed relation by the use of a vacuum wherein a vacuum is applied to the underside of the lowermost sheet of the assembly and all of the sheets of material of the assembly except the uppermost one is provided with openings through which the vacuum can act on the uppermost sheet of the assembly.

Another object is to provide a method of the type set forth wherein the sheets of material are flexible and the openings provided therein take the form of slits forming hinged tongues which can be drawn from the plane of the sheet(s) by the vacuum and which slits are oriented so that the assembled sheets can be fed through a subsequent machine without catching.

And a further object of the present invention is to provide an apparatus for carrying out the above-described method.

The novel features that I consider characteristic of my invention are set forth with particularity in the appended claims. The invention itself, however, both as to its organization and to its method of operation, together with additional objects and advantages thereof will best be understood from the following description when read in connection with the accompanying drawings in which:

FIGS. 1 and 2 are plan and side elevational views, respectively, of one form of multiple layer component which can be made according to the present invention;

FIG. 3 is a schematic elevational view, partly in section, showing an apparatus for carrying out the present invention;

FIG. 4 is a sectional view taken substantially on line 4—4 of FIG. 3;

FIG. 5 is an enlarged sectional detail showing an embodiment of the invention wherein the surface of the conveyer is provided with depressed areas to accommodate tongues formed by slits made in one or more of the lowermost layers of a multilayer assembly.

Generally, the object of the present invention is to hold two or more sheets of flexible material in a required superposed relation while necessary operations are performed on each of the sheets as they are moved to and through a work station. A conveyer which is used to support the sheets of material has a suitable number and arrangement of perforations or depressions in its supporting surface which can be evacuated. If two sheets of material are to be supported on this conveyer, the bottom sheet is provided with one or more perforations or openings through which a vacuum acting through the perforations or depressions of the conveyer can act to hold the two sheets on the conveyer. If more than two sheets of material are to be superposed, all but the top sheet will have openings through which the vacuum can act to hold the several sheets in proper superposed relation on the conveyer. It has been found that in some instances, rather than using holes punched out of the sheets, punched slits are better because they can be oriented to pass through a machine which is to ultimately handle the assembly of sheets without catching. Also, the use of slits eliminates the problems associated with the disposal of punched-out slugs which result from a perforating operation. These slits can take many forms, e.g., moon shaped, V-shaped, cross shaped, etc., so long as hinged tongues are formed which can be pulled into depressions in the conveyer by vacuum to provide openings sufficiently large to transmit the vacuum hold-down to the top sheet.

While the present invention can be used to assemble any number of different forms of multi-layer assemblies, in FIGS. 1 and 2, there is illustrated one form of multi-layer component which can be assembled by the use of the present invention. This multilayer component 10 comprises a lower layer 11 in overlapping relation with which a second layer 12 is sealed at one end as indicated at 13. On top of the second layer 12 there is positioned a strip or label 14 which may be sealed to the second layer 12 along opposite longitudinal edges as indicated at 15. The seals 13 and 15 can be heat and pressure activated if the sheets 11, 12 and 14 are made of a heat sealable material or have a coating on one or the other adjacent surfaces thereof which is heat activated. Also, these seals could be made by applying a liquid adhesive to these areas if so desired.

Multilayer component 10 can be made in a continuous and rapid manner by bringing three continuous webs into the desired superposed relation and conveying them in this relation to and from a work station, e.g., a sealing station, where they are sealed together as shown. Following these sealing operations the components 10 may be died out of the assembled continuous webs as indicated in FIG. 1. In order to clearly illustrate this method of assembly and fabrication of the components, in FIG. 1 a second component 10 is shown in phantom as it would be connected to an adjoining component 10 after the tapered ends have been died out but before they have been chopped apart along the line L. In moving to and from the sealing station the components 10 will move in the direction of the arrow A in FIG. 1. It is imperative that the three webs be held in proper superposed relation during the sealing operation and it is to this end that the present invention was devised.

Referring now to FIGS. 3 and 4 an apparatus will be described for assembling the multilayer component 10 according to the present invention. The sheets 11, 12 and 14 are initially supplied as continuous webs from supply rolls 11′, 12′ and 14′. Webs 11 and 12 are initially, or at some time prior to their reaching a vacuum conveyer which conveys them to the sealing station, respectively provided with a double row and a single row of longitudinally spaced perforations or slits 20, 21, and 22 so spaced transversely of the webs that when the webs are superposed perforations 20 in web 11 will lie under layer 12 adjacent the seal 13 and the perforations 21 and 22 in webs 11 and 12 will align with one another and lie under web 14, see FIGS. 1 and 5.

The means for conveying the webs to and from the work station is shown as comprising an endless belt 24 engaging driving rolls 26. The upper horizontal reach of this belt 24 slidably engages the top surface 28 of a hollow table 30 having upstanding edge guides 31 for laterally guiding the belt. The surface of the table may be supported by one or more struts 32 if necessary. The belt is provided with one row of longitudinally spaced perforations 34 arranged to align with the row of perforations 20 in web 11 and a second row of longitudinally spaced perforations 35 arranged to align with the row of perforations 21 in the web 11. The left strut 32, looking at FIG. 4, in combination with the bottom, top, and end wall of the table forms a vacuum manifold 38 which extends practically the full length of the table, see FIG. 3. This can be evacuated by any suitable means, not shown, through an exhaust pipe 39. Extending from the vacuum manifold 38 and through the top of the table are two elongated ducts 40 and 41 which are substantially as long as the manifold. One of these ducts 40 is in alignment with the row of perforations 34 in the conveyer belt 24 and the other 41 is in alignment with the other row of perforations 35 in the belt 24 so that as the belt moves across the top of the table the two rows of perforations have vacuum applied thereto. For making the heat seals 13 and 15 there are shown three narrow rollers 45, 46 and 47 which may be heated and pressed into engagement with the superposed webs 11, 12 and 14 by any suitable means, not shown, as the conveyer belt moves the webs along in superposed relation. While the sealing rollers 45, 46 and 47 have been shown in axial alignment this is not necessary. They can be staggered along the length of the table if it is so desired.

The three webs are fed from their supply rolls 11', 12' and 14' and are brought into proper superposed relation by flanged guide rolls 50 just before they engage the horizontal reach of the belt 24 to which vacuum is applied from the vacuum manifold. It will be understood that the feed of the webs 11 and 12 and the movement of the belt 24 must be such that the three rows of perforations 20, 21, and 22 in the webs 11 and 12 will come into and remain in alignment with the rows of perforations 34 and 35 in the belt as the webs and belt move across the surface 28 of the table 30 to and from the sealing station(s). In the present instance, since the webs are held onto the top of the conveyer belt 24 by vacuum so that they are fed along with the belt, it is only necessary to match the rows of perforations in the belt with those in the webs when initially threading up the apparatus. Thereafter the matching of the perforations in the web and in the belt will be maintained since the pitch between the perforations in the webs and in the belt are made equal to one another. Should it be found that the force necessary to pull the webs directly from their supply rolls is so great as to cause a slippage between the belt and the webs, or between the webs, then each web could be fed into a free loop just ahead of the conveyer belt from which they would be pulled by the belt.

Rather than providing the webs 11 and 12 with punched-out perforations, it has been found desirable to make slits therein so arranged as to form hinged tongues which will be hinged downwardly by the vacuum to provide an opening sufficient to allow the vacuum to act on the layer above the slit to hold it in proper superposed relation with the one below it. Slits have been found advantageous over perforations for the reason that no perforation slugs are formed which must be disposed of. Also, slits provide hinged tongues which normally lie in the plane of the layers when no vacuum is being applied so that when the finished component is to be moved through some machine during their use these slits can be so oriented that they will not catch on the machine and thus hinder their movement. For example, in the multiple component 10 the slits are shown oriented so that their hinge line faces the tapered end of the component because the component is adapted to be moved through a certain apparatus with the tapered end leading. Accordingly, should the lower layer 11 of the component 10 meet any obstruction in moving through an apparatus then the tongues formed by the slits will be hinged to their normal position in the plane of their layer rather than catching on any obstruction and opposing movement of the component. While in the drawing the slits have been shown having a horseshoe shape it goes without saying that they could take other shapes, e.g., moon shape, V-shape, cross slits. After the webs 11, 12 and 14 leave the sealing station(s), the individual components 10 may be chopped therefrom by first moving them through a station, not shown, where V-notches 60 are died from one edge thereof at spaced intervals, see FIG. 1, and after which the components are chopped apart, by means not shown, along line L extending transversely of the webs from the apex of the V-notch 60.

When the perforations take the form of slits as shown then the surface of the conveyer belt 24 must be provided with depressions 55, see FIG. 5, into which the tongues 20', 21', and 22' formed by the slits can be pulled to provide perforations 20, 21, and 22 when vacuum is applied thereto. These depressions 55 may take the form of individual recesses surrounding each of openings 34 and 35 in the belt, or one groove may run the length of the belt in embracing relation with each row of perforations 34 and 35 to receive these tongues when they are pulled out of the plane of the layer by vacuum.

Looking at FIG. 5 it will be seen that the vacuum applied to the surface of the belt through duct 40 will act through the perforations 20 in the lower layer 11 and on an unperforated part of the next layer 12 to hold these two layers in the desired superposed relation. At the same time, the vacuum acting on the upper layer 12 will pull the lower layer 11 into frictional driving relation with the belt so that the two layers will move along with the belt. Likewise, the vacuum applied to the surface of the belt through duct 41 will act through aligned perforations 21 and 22 in layers 11 and 12 and on the unperforated uppermost layer 14 to hold it in proper superposed relation with the layer 12. At the same time, the vacuum acting on the upper layer 14 will also act to pull the lowermost layer 11 into frictional driving relation with the belt and to pull layer 12 into contact with the lower layer 11. Should it be found that a greater driving friction is needed between the lower layer 11 and the belt surface to insure a nonslip drive between the two, then the belt could be provided with another row of perforations, not shown, connected to the vacuum manifold which would be under an unperforated area of the lower layer 11. If more hold power is required to hold the layers in superposed relation and/or in driving relation with each other and the belt, it is only necessary to provide more perforations or slits in the webs or use a higher level vacuum in the vacuum manifold.

From the above description it will be readily understood that the advantages of this method of holding two or more layers of material together include: two or more layers may be held together in a desired superposed relation from one side without the use of clamps: it makes it possible to handle fragile materials; no magnetic material is required for holding the materials together; and the use of punched slits eliminates the need for disposing of punched-out slugs. While for purposes of illustration the present invention has been disclosed as holding together layers of material which are in the form of continuous webs, it is to be understood that it is not limited to such an arrangement. For example, if it is desired to heat seal individual parts to a layer of material in spaced relation instead of a second continuous web, then such parts could be individually deposited onto the surface of the layer and above one or more perforations or slits therein just as, or after, the layer is fed onto the belt. The vacuum acting through the perforations in the layer would then hold the parts in a desired superposed relation with the layer while the two moved through the sealing station and become sealed together. In this instance, the belt should be provided with separate perforations or slits through which vacuum could act to drivingly hold the layer to the belt surface, or some other suitable means should be provided to drivingly associate the layer with the belt.

The invention has been described in detail with particular reference to preferred embodiments thereof, but it will be understood that variations and modifications can be effected within the spirit and scope of the invention as described hereinabove and as defined in the appended claims.

I claim:

1. The method of holding two layers of air-impervious material in prealigned superposed relationship wherein one of the layers is flexible comprising the steps of:
   a. making slits in selected areas of the flexible one of said layers, which slits are so shaped as to form hinged tongues which will be pulled out of the plane of the layer and make perforations in the layer when vacuum is applied to the surface thereof;

b. superposing said layers in the desired prealigned relationship; and c. applying a vacuum to the outside surface of the flexible layer in the selected areas including the slits.

2. The method of holding two layers of air-impervious material, one of which is flexible, in prealigned superposed relation while conveying them over a given path comprising the steps of:

a. making slits in selected areas of the flexible one of said layers, which slits are so shaped as to form hinged tongues which will be pulled out of the plane of the layer and make perforations in the layer when vacuum is applied to the surface thereof;

b. superposing said layers in the desired prealigned relationship;

c. moving the perforated layer over said path; and d. applying vacuum to the outside surface of the flexible layer while it is being moved over said path to draw the other layer down into surface contact with the flexible layer so that it will be moved along therewith, said vacuum acting on said other layer through the perforation formed in said flexible layer when the hinged tongues are pulled out of the plane of said flexible sheet by said vacuum.

3. The method of holding a plurality of elongated webs of air-impervious material in prealigned superposed relation while conveying them over a given path comprising the steps of:

a. making slits in corresponding selected areas spaced longitudinally of each web except one, said slits being so shaped as to form hinged tongues which will be pulled out of the plane of its web and make a perforation in the web when vacuum is applied to the surface thereof;

b. superposing said webs in the desired prealigned relationship with the unslitted web on the outside of the group of webs and with the slits in each of the remaining webs substantially aligned with those in the web immediately adjacent thereto;

c. moving the lowermost slitted web over said path, and d. applying vacuum to the outside surface of the lowermost slitted web while it is being moved over said path to draw the hinged tongues out of the plane of their webs and form perforations in the slitted webs through which said vacuum acts on the uppermost web to force the webs above the moving web into driving engagement with each other and/or the moving web to be moved along therewith.

4. An apparatus for conveying a plurality of layers of air-impervious material in prealigned superposed relation to and from a work station where a necessary operation is performed on one or all of said layers, all but one of the outermost of said superposed layers being perforated in corresponding selected areas, the other outermost layer being flexible and the perforations therein being in the form of slits so shaped as to form hinged tongues which will be pulled out of the plane of the layer to make perforations therein when vacuum is applied to the surface thereof, and comprising;

a. a conveyer movable to and from said work station and whose surface is provided with a plurality of depressions oriented to align with the slits in the flexible layer and which are of a shape and depth to allow the hinged tongues to be pulled out of the plane of the flexible layer;

b. means for applying a vacuum to that portion of the surface of said conveyer including said depressions during the time the conveyer is approaching, passing through and leaving said work station; and c. means for feeding said plurality of layers of material onto the surface of said conveyer in said prealigned superposed relation with the unperforated layer at the outside of the multilayer assembly and with the perforations and/or slits in the other layers substantially in alignment with each other and depositing the multilayer assembly on the surface of said conveyer as it approaches said work station with the flexible layer engaging the surface of the conveyer and the slits therein aligned with the depressions in said surfaces, whereby vacuum acting through the perforations formed in the flexible layer by pulling the hinged tongues of said layer out of the plane of said layer and the aligned perforations in said other perforated layers exerts a downward pull on the unperforated layer to hold said layers in superposed relation and to force the flexible layer into driving engagement with said conveyer.

5. An apparatus for conveying a plurality of layers of air-impervious material in prealigned superposed relation as defined in claim 4, wherein said plurality of layers are elongated webs in which the perforations or slits therein are correspondingly spaced longitudinally of the webs, and in which the vacuum applying means comprises a vacuum manifold having a holddown surface communicating with the interior thereof, and in which the conveyer comprises a continuously moving air-pervious endless belt at least a reach of which engages the surface of said vacuum manifold to have vacuum transmitted therethrough as it passes said vacuum manifold and onto the outer surface of which belt the plurality of elongated webs are fed in prealigned superposed relation.

6. An apparatus for conveying a plurality of webs of air-impervious material in prealigned superposed relation as defined in claim 5, wherein the holddown surface of the vacuum manifold is elongated, wherein the conveyer belt is made of air-impervious material and is provided with perforations spaced longitudinally thereof in correspondence with the longitudinal spacing of the perforations and slits in said webs to align therewith when the webs are deposited on said belt, said holddown surface of said vacuum manifold provided with elongated slits communicating with the interior of said manifold which align with the perforations on said belt as it moves across the holddown surface.

* * * * *